Dec. 26, 1950　　　　　E. C. WAHLBERG　　　　　2,535,824
COMMUTATOR
Filed Nov. 20, 1946
*Fig. 1*
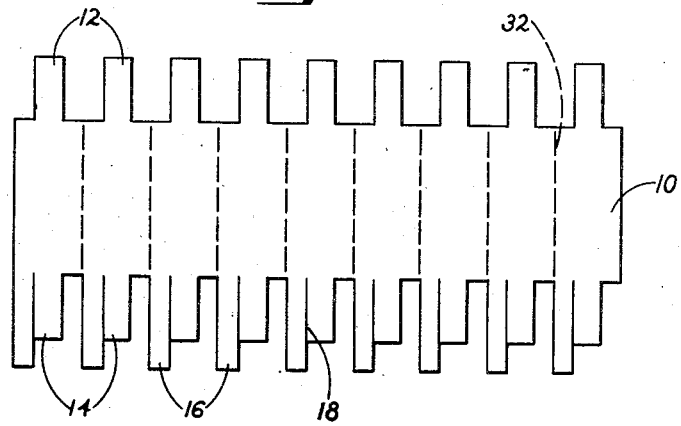
*Fig. 2*
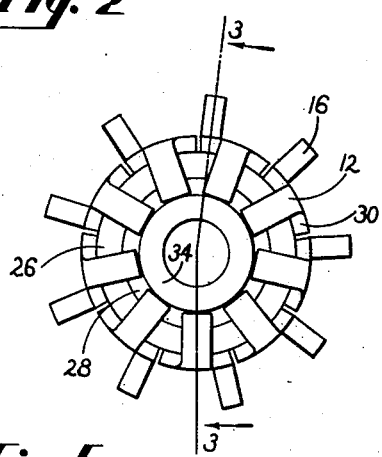
*Fig. 3*
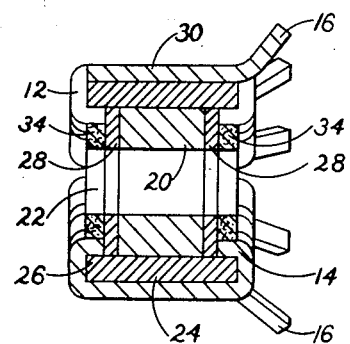
*Fig. 5*
*Fig. 4*
*Fig. 6*
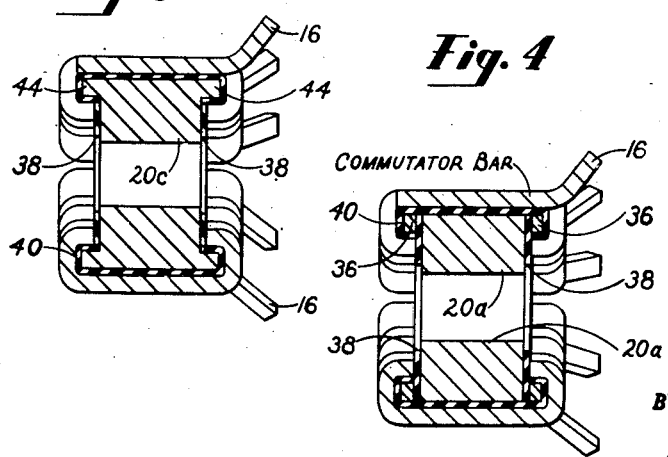
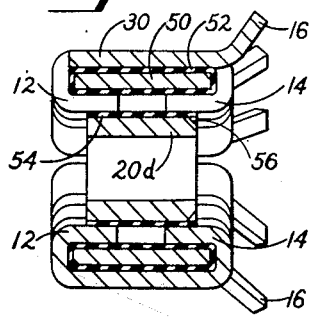
INVENTOR.
ERIC C. WAHLBERG
BY
Thomas C. Betts
ATTORNEY.

Patented Dec. 26, 1950

2,535,824

UNITED STATES PATENT OFFICE 2,535,824

COMMUTATOR

Eric C. Wahlberg, Stamford, Conn., assignor to Electrolux Corporation, Old Greenwich, Conn., a corporation of Delaware Application November 20, 1946, Serial No. 711,105

4 Claims. (Cl. 171—321)

My invention relates to commutators of the type wherein the bars are secured in place on a hub structure by means of anchoring tabs extending from the ends of the bars and bent into clamping relation with the hub structure.

Heretofore, the usual practice in fabricating such commutators has been to employ a rigid insulating material, such as Bakelite or other phenolic resin condensation product, for the hub structure in order to insulate the bars from each other. However, while such material may be suitable for low duty low speed motors, it has not proved to be adequate for powerful high speed motors due principally to the fact that the ozone produced as a result of sparking during commutation reacts chemically with the material at the high temperatures prevailing, the effect of the reaction being to reduce the material to a granular state with an attendant loss of mechanical strength.

Accordingly, among the objects of my present invention is to construct a commutator which is free of this disadvantage, while still being relatively inexpensive. In accordance with my invention this is accomplished by using a hub structure including at least one annular metal element which possesses sufficient strength and is not adversely affected by heat and ozone. Suitable insulation is provided between the commutator bars and the metal element, or elements and the insulation, as well as all of the elements of the hub structure are held in assembled relation by the clamping action of the anchor tabs, which of course also holds the bars in position.

Further objects and advantages of my invention will be apparent from the following description considered in connection with the accompanying drawings, which form a part of this specification and of which:

Fig. 1 is a plan view of a strip of metal stamped in a manner and for a purpose to be hereinafter described;

Fig. 2 is an end view of a commutator in accordance with my invention;

Fig. 3 is a cross-sectional view taken on the line 3—3 of Fig. 2;

Fig. 4 is a view similar to Fig. 3, but showing a second embodiment of a commutator;

Fig. 5 is a similar view of a third embodiment; and

Fig. 6 is a similar view of a fourth embodiment of a commutator.

Referring first to Fig. 1, reference character 10 designates a strip of material, which ordinarily will be copper. This strip is stamped or otherwise cut so as to have a plurality of anchoring tabs 12 extending from one edge thereof and a plurality of similar anchoring tabs 14 extending from the opposite edge. In addition, a plurality of soldering tabs 16 extend from one of the edges, the soldering tabs being preferably somewhat longer than the anchoring tabs 14. The lines 18 between each anchoring tab 14 and the adjacent soldering tab 16 designates a cut in the sheet.

After the sheet is stamped so as to have the configuration shown in Fig. 1 it is formed into a cylinder, preferably by being rolled around a mandrel of suitable diameter. Thereafter, the cylinder is placed around a hub structure. As shown in Figs. 2 and 3, this structure includes an inner hub member 20, preferably of metal, and formed with a bore 22 adapted to be secured to the armature shaft of a motor. Around the inner hub member 20 is an outer hub member or sleeve 24 of insulating material, such as fiber, the inner diameter of which is such as to give a fairly snug fit around the inner hub member. The axial length of the sleeve 24 is greater than the length of the inner hub member 20 so that the sleeve projects axially beyond the hub member at each end so as to form lips or flanges 26. Discs of insulating material 28 are placed at each end of the inner hub member 20 and within the outer hub member 24. Thereafter, the axially projecting anchoring tabs 12 and 14 are bent inwardly around the lips or flanges 26 and against the discs 28 to the position shown in Fig. 3. In this position the anchoring tabs securely clamp the cylinder to the outer hub member 24 and also secure the outer hub member against axial displacement with respect to the inner hub member 20. The bending of all of the anchoring tabs at one end of the commutator may be accomplished simultaneously by a suitable tool which first bends them radially inwardly and then axially inwardly to the position shown.

Thereafter, the cylinder is slotted axially so as to divide it into a plurality of circumferentially spaced commutator bars 30. In Fig. 1 the broken lines 32 indicate the lines along which the cylinder is slotted, and it will be seen that these lines are between adjacent anchoring tabs. In other words, after slotting, each bar is provided with an anchoring tab 12 on one end and an anchoring tab 14 and a soldering tab 16 on the other end, and the anchoring tabs serve to securely fix the individual bars to the hub structure after the bars have been separated from each other by the slotting operation. Either before or after the slotting, the soldering tabs 16 may be bent outwardly so as to provide convenient projections to which the armature leads may be soldered.

As shown in Fig. 3, rings 34 of rigid insulating material, such as fiber, may be inserted within the inturned ends of the anchoring tabs, so as to force these ends radially outwardly and to maintain them in clamping contact with the lips or flanges 26 of the outer hub member 24. However, tests have shown that these rings 34 are not usually necessary, and that the commutator bars will remain securely in place without them.

In the embodiment illustrated in Fig. 4 the commutator is the same as that previously described, except for the hub structure. In this embodiment the hub structure includes the inner hub member 20a, preferably of metal, and a rigid metal ring 36 disposed at either end thereof. An insulating disc 38, which may be of mica, is disposed at either end of the hub 20a and may extend between the hub and the rings 36, or it may have a diameter substantially equal to the inner diameter of the rings.

A sleeve 40 of flexible insulating material, such as a sheet of mica flakes in a binder is placed around the hub member 20a and the rings 36 and within the copper cylinder. The original length of the sleeve is in excess of the combined axial length of the hub and the two rings, so that it extends axially therebeyond about the same distance as do the anchoring tabs 12 and 14 before the latter are bent. When the tabs are bent inwardly around the rings 36, the excess length of the insulating sleeve is bent with them so as to provide insulation between the tabs and the lips. In this embodiment the anchoring tabs, when bent, serve to anchor the copper cylinder, the rings 36 and the central hub member 20a to each other. Thereafter, the cylinder is slotted as before, so as to provide spaced commutator bars and the soldering tabs 16 are bent outwardly.

The embodiment shown in Fig. 5 is somewhat similar to that shown in Fig. 4, except that the central hub portion 20c, which preferably is made of metal, has flange portions 44 integral therewith, instead of separate rings 36 as in Fig. 4. In this embodiment a sleeve of insulating material 40 is provided which initially is longer than the axial length of the hub, including the peripheral flanges so that, when the anchoring tabs are bent inwardly, the ends of the insulating sleeve are bent in the same manner so as to provide insulation between the tabs and the flanges 44. Insulating discs 38, similar to those shown in Fig. 4 are likewise provided in order to prevent the ends of the tabs from directly contacting hub portion 20c, which if permitted would of course short-circuit all the bars.

In the embodiment illustrated in Fig. 6, the copper cylinder is placed around an annular member 50 which is made of metal covered by an insulating layer 52. The anchor tabs 12 and 14 are then bent inwardly around the ends of member 50 so that the end portions of the tabs are disposed radially within the annular member. A cylinder of insulating material 54 is then inserted radially within the end portions of the tabs and an inner hub member 20d is forced into this cylinder. The outer diameter of the hub member 20d is such that it has a driving fit within the end portions so as to maintain the latter tightly clamped against the inner surface of the annular member 50 to thereby rigidly secure the armature bars in place after the copper cylinder has been slotted to form the spaced bars. The entering end of the hub member 20d is preferably tapered somewhat, as indicated at 56 so as to facilitate its passage into the insulating cylinder 54 without damaging the latter.

The construction in accordance with Fig. 6 is particularly well adapted for commutators of larger sizes, particularly if they are to be run at high speeds and hence subjected to large centrifugal force.

A commutator in accordance with the present invention readily lends itself to mass production and requires little or no skilled labor in its fabrication. Tests have conclusively shown that the commutator bars are anchored rigidly to the hub structure and do not shift relative thereto, even though no insulation is provided in the slots separating the bars. The absence of such insulation is a distinct advantage, as it eliminates the necessity of the usual under-cutting operation, which is normally required both on a new commutator and when a worn commutator is turned down, in order to remove insulation from between the bars to a depth sufficient to permit a reasonable amount of wear. Commutators in accordance herewith also are able to withstand high temperatures, inasmuch as they contain no plastic or other material susceptible to damage by heat.

Under certain circumstances it might be sufficient to provide anchor tabs at only one end of each bar, for instance if the commutator were to be used on a slow speed motor where centrifugal force is not great, but ordinarily any slight advantage resulting from a saving of material would be out-weighed by the reduction in strength of the commutator.

While I have shown and described several preferred embodiments of commutators in accordance with my invention, as well as a preferred method of fabricating commutators, it will be understood that this has been done for illustration only and that the scope of my invention is not to be limited thereto, but is to be determined from the appended claims.

What I claim is:

1. In a commutator, a metallic hub member having an integral axially extending peripheral flange at each end thereof, insulating material around said hub member having a substantially smooth cylindrical outer surface and being formed of a single seamless piece of material, the end portions of said insulating material originally extending axially beyond said flanges, insulating discs at the ends of said hub member and inwardly of said flanges, a plurality of commutator bars circumferentially spaced around said hub member and said insulating material, and an anchor tab extending from each end of each bar, said tabs being bent inwardly around and under said flanges with the axially extending end portions of said insulating material disposed between the tabs and the flanges and with said discs disposed between the ends of the tabs and said hub member.

2. In a commutator, a cylindrical metal hub having an axially extending peripheral flange at each end thereof, insulating members providing a cylindrical portion and an end portion conforming to the flanged end of said hub, said insulating members enclosing said hub to insulate the cylindrical and end surfaces thereof, a plurality of commutator bars circumferentially disposed around the insulated hub, and an anchor tab extending from each end of each bar, said tabs being bent inwardly around said flanges to secure said bars, said insulating members and said hub in assembled relationship.

3. In a commutator, a cylindrical metal hub having an axially extending peripheral flange at each end thereof, insulating material providing a cylindrical portion and end portions conforming to the flanged ends of said hub, said insulating material enclosing said hub to insulate the cylindrical and end surfaces thereof, a plurality of commutator bars circumferentially disposed around the insulated hub, and an anchor tab extending from each end of each bar, said tabs being bent inwardly around said flanges with the ends of said tabs in contiguous relation to the portion of said insulating material radially inward of said flanges to secure said bars, said insulating members and said hub in assembled relationship.

4. In a commutator, a metallic hub member having an integral axially extending peripheral flange at each end thereof, insulating material around said hub member having a substantially smooth cylindrical outer surface which is circumferentially continuous and end portions covering all of the end surfaces of said hub, commutator bars circumferentially spaced around said hub member and said insulating material, and an anchor tab extending from each end of each bar, said tabs being bent inwardly around said flanges with the end portions of said insulating material disposed between the ends of the tabs and said hub member.

ERIC C. WAHLBERG.

REFERENCES CITED

The following references are of record in the file of this patent:

UNITED STATES PATENTS

| Number | Name | Date |
| --- | --- | --- |
| 1,207,359 | Aufiero | Dec. 5, 1916 |
| 1,410,914 | Hartzell | Mar. 28, 1922 |
| 1,550,528 | Fitzgerald | Aug. 18, 1925 |